Patented Sept. 5, 1922.

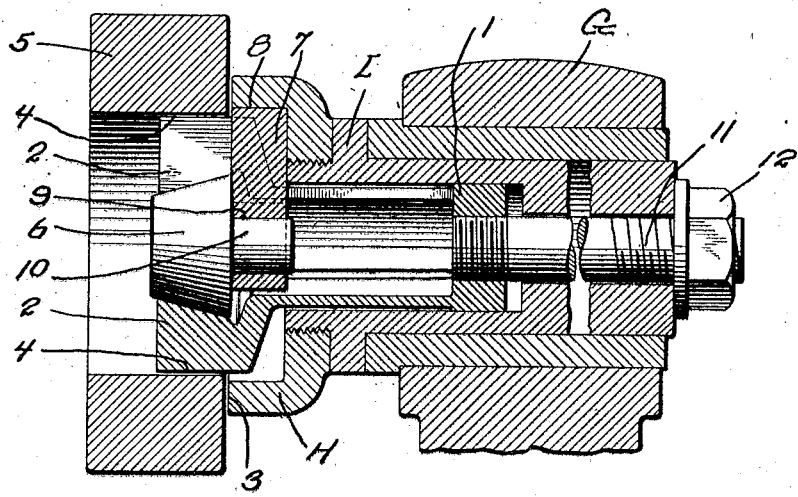
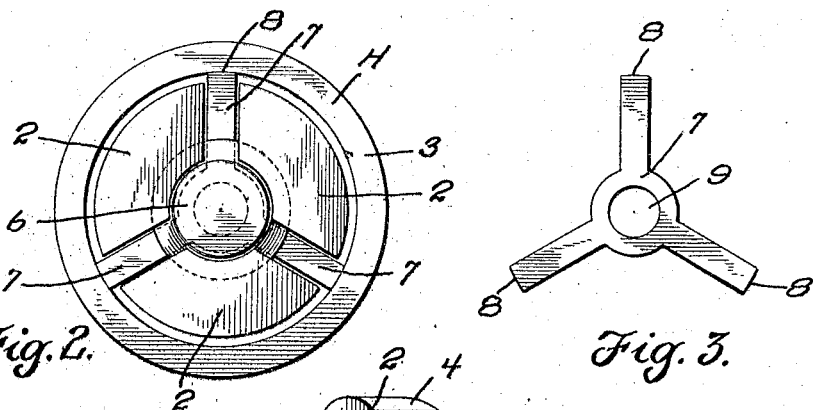
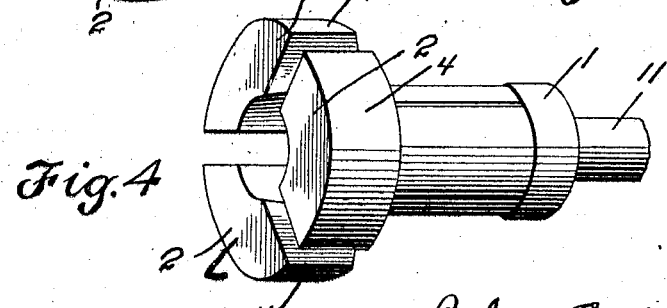

1,428,100

UNITED STATES PATENT OFFICE.

JOHN O. KAHL, OF PHILADELPHIA, PENNSYLVANIA.

INTERNAL CHUCK.

Application filed May 28, 1919. Serial No. 300,321.

*To all whom it may concern:*

Be it known that I, JOHN O. KAHL, a citizen of the United States, residing at Philadelphia, in the county of Philadelphia and State of Pennsylvania, have invented certain new and useful Improvements in Internal Chucks, of which the following is a specification.

This invention relates to an internal chuck.

The object of the invention is to provide a chuck which is of simple, practical and durable construction.

A further object is to provide a chuck which will firmly grip the work, one which may be quickly and easily operated and which will at the same time insure that the work is held true.

A further object is to so design the parts of the chuck that the strains required for gripping and supporting the work are adequately and properly provided for.

Other objects and aims of the invention more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:

Figure 1 is a transverse sectional view through a chuck constructed in accordance with this invention, a piece of work being illustrated in position to be gripped thereby.

Figure 2 is a front elevational view of the complete chuck.

Figure 3 is a detail view of a spider employed in the device, and

Figure 4 is a perspective view of the clutch jaws, or collet, detached.

Referring to the drawings for describing in detail the structure which is illustrated therein, the reference character L indicates a spindle which is suitably supported in a standard or the like, as G, of a lathe or similar tool. An extension collar H is arranged at one end of the spindle, said collar being preferably detachably connected with the spindle so as to facilitate the substitution of collars of different proportions according to the size and character of the work to be dealt with.

The spindle is made hollow and into it is fitted the reduced portion 1 of the collet shown in Fig. 4. The enlarged portions, or heads 2 of the collet extend into the collar H and project beyond the edge surface 3 of the collar so that the outer circumferential surfaces 4 of said heads collectively constitute the gripping surface of the collet, said surfaces 4 being adapted to extend into a suitable opening in the work, as 5, to be supported.

The reduced portion of the collet, which extends into the interior of the spindle, is in the form of a split tube, the sections being connected with the heads 2 and serving as resilient supports for said heads of a character to yieldingly urge the heads toward a common center.

Between the heads 2 is arranged a cone 6, said cone being supported by the spider 7 shown in Fig. 3. The interior surfaces of the heads 2 are shaped to coincide with the angle of inclination of the surface of the cone 6, and the spider 7 serves to hold the cone rigid and immovable with respect to the collar H.

Movement of the collet heads 2 backwardly into the collar serves to spread said heads apart and into gripping relation with the work.

Since the spreading movement of the heads is accompanied by a movement of the heads into the collar, said two movements serve not only to grip the work but at the same time to move the work tightly against the truing surface 3 of the collar. It is apparent, therefore, that by making the surface 3 of the collar true and square with the longitudinal axis of the chuck, the work will also be held true, and that this highly desirable result is attained without any special effort on the part of the operator.

The spider 7 has its legs extending between the heads 2, the outer end surfaces, as 8, of the legs being fitted tightly within the collar H. At the center of the spider is an opening 9 within which a stem 10 of the cone 6 is secured.

To move the collet jaws over the cone, a rod 11 is connected at the rear end of the collet and extends backwardly through the rear end of the spindle L where it carries suitable adjusting means, as the nut 12. Rotation of the nut 12 in one direction will draw the jaws into gripping position, while contra-rotation of the nut will permit releasing movement of the heads.

It is to be particularly noted that in use the position of the cone 6 is directly within the work so that the pressure of the heads outwardly against the work results in a direct crushing strain upon the cone. Further, it is to be noted that the spider for supporting the cone is itself rigidly mounted at a point directly adjacent to the work. This arrangement of parts serves to admirably distribute the strains incident to use, and gives particularly good support to the work.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. An internal spring collet comprising a plurality of spring jaws having a tendency to non-gripping position, a cone device stationary between said jaws, means providing a truing surface surrounding said jaws, and means operable to move the jaws relative to said cone device in a manner to spread the jaws into engagement with the work and for moving the work into engagement with said truing surface.

2. An internal spring collet comprising a plurality of gripping jaws, a cone device cooperative with said jaws whereby relative movement will produce spreading of the jaws into gripping position, means providing a truing surface adjacent to said jaws, the cone device being disposed so as to stand directly within the work gripped by said jaws, and means for producing relative movement of said jaws and cone device for moving the work into engagement with said truing surface.

3. A chuck comprising a plurality of jaws, a collar surrounding said jaws, supporting means for said collar, a cone device intermediate said jaws, a spider connected with said cone device and extending into engagement with said collar for supporting the cone device stationary with respect to the collar, and means for moving the jaws with respect to the cone device.

In testimony whereof I affix my signature in the presence of two witnesses.

JOHN O. KAHL.

Witnesses:
 MARY KAHL,
 JOHN MORRIS.